US010146858B2

(12) United States Patent
Byron et al.

(10) Patent No.: US 10,146,858 B2
(45) Date of Patent: Dec. 4, 2018

(54) DISCREPANCY HANDLER FOR DOCUMENT INGESTION INTO A CORPUS FOR A COGNITIVE COMPUTING SYSTEM

(71) Applicant: International Business Machines Corporation, Armonk, NY (US)

(72) Inventors: Donna K. Byron, Petersham, MA (US); Elie Feirouz, Lexington, MA (US); Ashok Kumar, Bedford, MA (US); William G. O'Keeffe, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 14/966,568

(22) Filed: Dec. 11, 2015

(65) Prior Publication Data
US 2017/0169017 A1 Jun. 15, 2017

(51) Int. Cl.
G06F 17/00 (2006.01)
G06F 17/30 (2006.01)

(52) U.S. Cl.
CPC .. G06F 17/30684 (2013.01); G06F 17/30705 (2013.01)

(58) Field of Classification Search
CPC .......... G06F 17/3082; G06F 17/30864; G06F 17/30964; G06F 17/241; G06F 17/30781
See application file for complete search history.

(56) References Cited

U.S. PATENT DOCUMENTS

| | | | |
|---|---|---|---|
| 7,313,515 B2 | 12/2007 | Crouch et al. | |
| 7,461,047 B2 | 12/2008 | Masuichi et al. | |
| 8,370,275 B2 | 2/2013 | Bhattacharya et al. | |
| 8,560,300 B2 | 10/2013 | Ferrucci et al. | |
| 9,015,098 B1 | 4/2015 | Crosley | |
| 2002/0127521 A1 | 9/2002 | Fegan | |
| 2014/0006557 A1 | 1/2014 | Lingren et al. | |
| 2014/0120513 A1 | 5/2014 | Jenkins et al. | |
| 2014/0172139 A1 | 6/2014 | Clark et al. | |
| 2014/0172756 A1 | 6/2014 | Clark et al. | |

(Continued)

FOREIGN PATENT DOCUMENTS

WO 2013125286 A1 8/2013

OTHER PUBLICATIONS

Yuan, Michael J.; "Watson and Healthcare", Apr. 12, 2011, retrieved on Dec. 3, 2015 from http://www.ibm.com/developerworks/library/os-ind-watson/.

(Continued)

*Primary Examiner* — Truong Vo
(74) *Attorney, Agent, or Firm* — Robert H. Frantz; William J. Stock

(57) ABSTRACT

A new document is processed for ingestion into a corpus of a cognitive computing system by associating with a category of documents already contained within the corpus, such as a topical category. Then, the cognitive computing system is engaged automatically to query one or more questions previously-associated with the category to discover discrepancies between the new document and those already in the corpus. If a discrepancy is found, a confidence factor based upon extracted natural language entities and relationships is assigned to the discrepancy, and it is flagged and reported to a user for reconciliation.

18 Claims, 9 Drawing Sheets

(56) References Cited

U.S. PATENT DOCUMENTS

| | | |
|---|---|---|
| 2014/0172878 A1 | 6/2014 | Clark et al. |
| 2014/0172880 A1 | 6/2014 | Clark et al. |
| 2014/0172882 A1 | 6/2014 | Clark et al. |
| 2014/0172883 A1 | 6/2014 | Clark et al. |
| 2014/0365502 A1* | 12/2014 | Haggar ............. G06F 17/30684 707/748 |
| 2015/0026106 A1 | 1/2015 | Oh et al. |

OTHER PUBLICATIONS

High, Rob; "The Era of Cognitive Systems: An Inside Look at IBM Watson and How it Works", 2012, retrieved on Dec. 3, 2015 from www.redbooks.ibm.com/redpapers/pdfs/redp4955.pdf.

Temperley, Davy, et al.; "Link Grammar", retrieved on Nov. 30, 2015 from http://www.link.cs.cmu.edu/link/.

Byron, Donna K., et al.; "Utilizing a Dialiectical Model in a Question Answering System"; U.S. Appl. No. 14/722,862, filed May 27, 2015.

Ferrucci, D. A., et al.;"This is Watson", IBM Journal of Research and Development, vol. 56, No. 3/4, May/Jul. 2012.

Ferrucci, David, et al.; "The AI Behind Watson—The Technical Article"; 2010, retrieved on Nov. 12, 2015 from http://www.aaai.org/Magazine/Watson/watson.php.

IBM; "Watson—A System Designed for Answers", Feb. 2011.

Kelley III, Joe. E; "Computing, cognition and the future of knowing", Copyright 2015 by IBM Corporation.

Budnik, Tom, et al.; "High Throghput Computing on IBM's Blue Gene/P".

\* cited by examiner

300

500

501  | John Doe | died | March 26th | at | UMass Medical Center | from | Stage 4 Cancer |

502   Person         Date        Location, Hospital        Disease, Cancer

503   | John Doe, | leaving a | wife | a | child, | died | today | at | UMass |

504        Person        Temporal, Date      Location, [Hospital|College]

601  John Doe, leaving a wife a child, died March 27th at UMass

602  Person       Temporal, Date     Location, [Hospital|College]

701 John Doe died March 26th

Conflict, 100% confidence, temporal entities do not match 705
702 John Doe died March 27th 703 John Doe died At UMass Medical Center Conflict, 20% confidence, location types may not match 706
704 John Doe died at UMass

DISCREPANCY HANDLER FOR DOCUMENT INGESTION INTO A CORPUS FOR A COGNITIVE COMPUTING SYSTEM

INCORPORATION BY REFERENCE

U.S. patent application Ser. No. 14/722,862, filed on May 27, 2015, by Donna K. Byron, et al., and non-patent literature publication "*This is Watson*", by D. A. Ferruci, et al., in the IBM Journal of Research and Development, Volume 56, Number 3/4, May/July 2012, are incorporated by reference in their entireties, including drawings.

BACKGROUND

This invention relates generally to methods to align and reconcile a newly-ingested document into a cognitive computing system corpus of previously ingested documents where differences and contradictions arise between the new and previous documents and information elements.

Approximately 80% of online and digital data today is "unstructured data", such as news articles, research reports, social media posts, and enterprise system data. Unlike "structured data", e.g., databases, configuration tables, etc., which is readily useable by traditional computing processing, unstructured data is not directly compatible with traditional computer processes.

Understanding and interpreting unstructured data, such as electronic documents expressed in Natural Language (NL), is beyond the capacities of traditional search engines. Traditional search engines find keywords, and rank their findings according to the number of appearances of each keyword and their proximities to each other. In order to effectively use a keyword-based search engine, a user must input the most effective keywords. But, if the user does not know the correct keywords, the search engine may be of little use.

Further, keyword-based search engines have no ability to assign "right" or "wrong" to their results because they do not interpret their findings, and thus cannot detect disagreements between two or more search findings. For example, if a user is searching for a likely cause of a particular abdominal malady, he or she may input the symptoms (abdominal pain, nausea, etc.) as keywords into a keyword-based search engine. Two documents may be found by the search engine, each of which has similar quantities of appearances of the keywords (references to the symptoms) and thus are ranked similar to each other. However, the documents may depart radically from each other in their explanations of the potential cause (allergy, food poisoning, cancer, etc.) of the symptoms. The user must now try to make sense of these documents and determine which is correct, if either.

SUMMARY OF THE INVENTION

A new document is processed for ingestion into a corpus of a cognitive computing system by associating with a category of documents already contained within the corpus, such as a topical category. Then, the cognitive computing system is engaged automatically to query one or more questions previously-associated with the category to discover discrepancies between the new document and those already in the corpus. If a discrepancy is found, a confidence factor based upon extracted natural language entities and relationships is assigned to the discrepancy, and it is flagged and reported to a user for reconciliation.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

FIGS. 5 and 6 illustrate entities extracted from example text strings using natural language processing.

DETAILED DESCRIPTION OF EMBODIMENT(S) OF THE INVENTION

Problems Recognized

Figure 1:
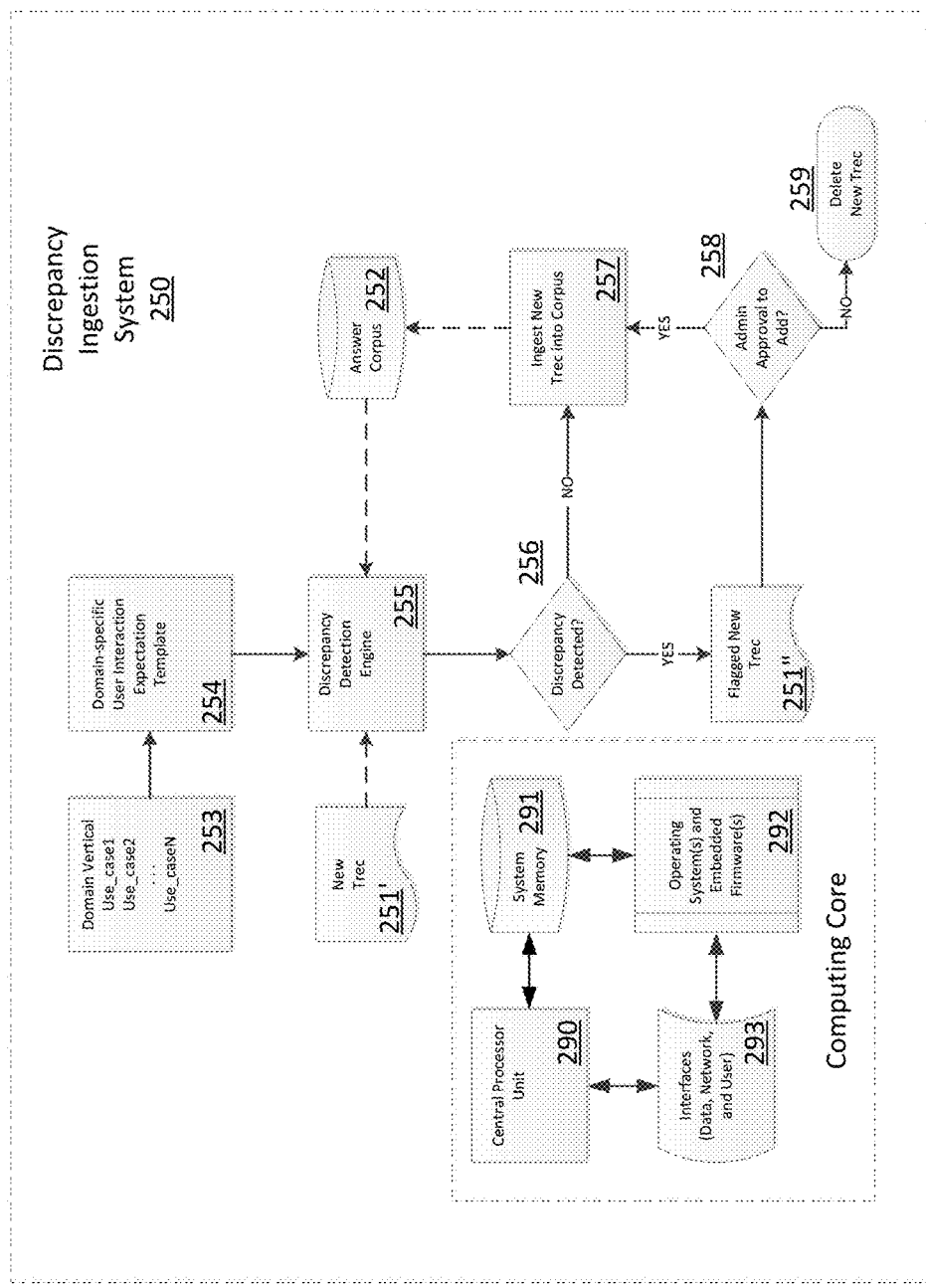
FIG. 1 illustrates a specialized document ingestion system which, in one embodiment, incorporates a computing core or customized logical circuit for processing logic which performs a logical process, such as by executing program instructions.

The present inventors have realized that certain newer computing technologies may be combined, modified and operated in novel ways to improve upon the state of the art in search engines as described in the Background. By leveraging cognitive computing technology, inclusion of new electronic information sources in Natural Language can be improved by automatically interpreting the new document so that it can be compared to existing documents already within a domain of knowledge. Through this interpretation, a search computer system can detect disagreement between the new document and one or more documents already within the search systems purview.

Cognitive Computing and Deep Search Engines.

Cognitive computing systems employ Natural Language Processing (NLP) to understand unstructured data, as well as machine learning processes which adapt and grow as additional unstructured language documents are ingested into a corpus of the cognitive computing system. An information corpus refers to a collection of unstructured data, such as a collection of digital or digitized literature, encyclopedias, dictionaries, thesauri, user's manuals, press releases, legal texts, medical reference materials, news articles, academic text books, electronic messages, web logs ("blogs"), and social media postings.

These types of unstructured information items are usually expressed in various forms of natural language, so of it being more formally formatted (e.g., grammatically correct sentences and paragraphs, usage of proper terminology and definitions according to linguistic dictionaries, etc.), and some of it being more informally formatted (e.g., sentence fragments, use of time-dependent terminology such as slang, etc.)

International Business Machine Corporation's (IBM's) Watson™ platform is one such example of a cognitive computing system. Google's DeepMind™ and HP's Autonomy™ may also be viewed by some as a cognitive computing systems. Some subject-matter-specific cognitive computing systems have been proposed, such as DeepListening's automated personality analysis that operates on a short-message corpus for a single or group of messaging service users, and others such as TheySay, Lexalytics, etc.

Such systems typically employ combinations of NLP, artificial intelligence (AI) and machine learning (ML) to provide Deep Semantic Analysis of large corpuses of unstructured data. Many are provided as a platform, such as a networked computing service (e.g., on-demand computing, cloud computing, etc.) which can be engaged by other computer systems and users via an application programming interface (API).

Cognitive computing systems go far beyond typical keyword-based search engines by allowing users (human users and other computer processes) to ask complex questions. In response to a natural language query, a cognitive computing system analyzes the unstructured data in its corpus using NLP to understand grammar and context of each information item, and it presents candidate answers and/or solutions to the user ranked by certainty of correctness.

Before attempting to answer any questions for a user, a cognitive computing system must "learn" a new subject. It does so by loading or "ingesting" a plurality of unstructured language documents, electronic messages, web pages, etc., into the corpus, and question and answer pairs are added to train the system on the subject. As new unstructured language information becomes available, it may also be ingested into the corpus to expand the knowledgebase for future answers.

After an initial corpus is built and the system has been trained on the subject, when a user asks a new complex question of the system, it searches the corpus to find a plurality of potential answers. It also collects evidence within the corpus, such as how many sources agree on a particular possible answer, and rates the quality of the evidence according to a scoring process. Finally, potential answers which meet a threshold of confidence of being correct are ranked against each other and presented or returned to the user.

Figure 2:
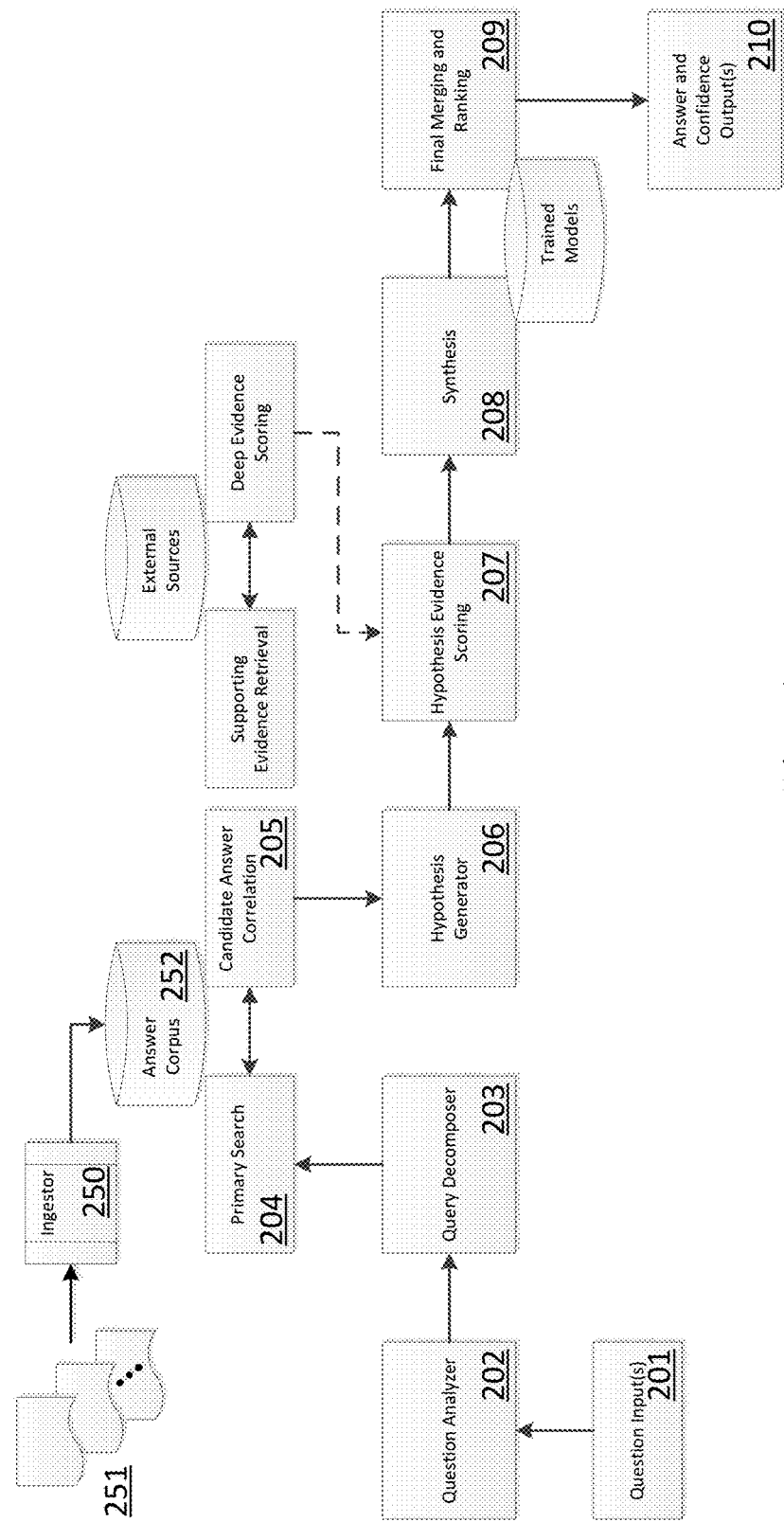
FIG. 2 sets forth one potential embodiment of the present invention relative to a cognitive computing system.

Referring to FIG. 2, one available embodiment of the present invention is integrated as a document ingestion pre-processor (250) of the corpus-building and textual resource acquisition function of a cognitive computing system, such as the functions described in the "Content Acquisition" section of "The AI Behind Watson—The Technical Article" by David A. Ferrucci, et al., (Association for the Advancement of Artificial Intelligence), and also described in "This is Watson", by Ferrucci, et al. (IBM Journal of Research and Development, Volume 56, Number 3/4, May/July 2012, see especially pages 4:1-4:11), both of which are incorporated by reference into the present disclosure. Other configurations and architectures may be produced by other cognitive computing systems, to which embodiments of the present invention may equally well provide improvement.

The exemplary improved cognitive computing system (200) is comprised of a computing system having one or more computer-readable memory devices, microprocessors, appropriate power supplies, computer network interfaces, and an operating system with application programs. One or more functions within the operating system and/or application programs implement machine logic functions (202-211).

Prior to handling input questions, corpus content (252) is acquired usually through a combination of manual and automatic steps. Example questions representative of the problem space (i.e., knowledge domain) are analyzed to produce a description of the kinds of questions that must be answered and a characterization of the application domain. Analyzing example questions may be manually performed, and domain analysis may be informed automatically by statistical analyses, such as the lexical answer type (LAT) analysis. For example, when IBM prepared its Watson cognitive computing system to play the Jeopardy game against human contestants, a corpus of information was prepared by ingesting a wide range of digital encyclopedias, dictionaries, thesauri, newswire articles, literary works, etc. (251).

After a baseline corpus (252) is established, an automatic corpus expansion process engages having four high-level steps:
(1) identifying seed documents and retrieving related documents from the networked storage servers such as web servers;
(2) extracting self-contained text fragments from the retrieved documents;
(3) scoring the fragments based on whether they are informative relative to the original seed document; and
(4) merging the most informative fragments into the information corpus.

During runtime, the cognitive computing system receives a question or query input (201), analyzes (202) the question and decompose (203) it. A primary search (204) on the corpus is performed, and candidate answers are correlated (205) and provided to a hypothesis generator (206). Optionally, evidence to support or discredit each hypothesis may be used to score (207) the candidate answers against the one or more candidate answers. Synthesis (208) and final merging and ranking (209) using trained models of the knowledge domain yield one or more outputs (210) which may be human readable (e.g., an answer to a question in a game show or a possible answer to a medical mystery, etc.), machine readable (e.g., via an API), or both.

Recognition of Benefits of Early Detection of Conflicting Information

The present inventors have realized that, during corpus initialization, some documents may be ingested which disagree with or are contradictory with some of the previously-ingested documents. Thus, they have discovered an opportunity to detect, flag and resolve these contradictions early in the corpus building process, thereby relieving and enhancing future search and classification steps. Some embodiments of the present invention will be realized as a document ingestion pre-processor (250) as shown in FIG. 2, although other embodiments may integrate the machine logic functions according to the invention in other points of a cognitive computing system architecture.

Exemplary embodiments of this invention relate to document ingestion (250) into a corpus for an information retrieval system, especially for cognitive computing systems such as but not limited to the IBM Watson™ computing system. In information retrieval systems, documents from which answers and information are retrieved form the corpus. The accuracy of the information in the corpus is important, and the present inventors have recognized that it is desirable to have an ingestion tool that can automatically detect discrepancies between documents in a corpus. Embodiments according to the present invention include a discrepancy engine that can flag documents with discrepancies using a multi-phased process. A first phase is to map potential or previously asked questions to documents or sub-document sections (TRECs) based on the source of an answer. In a second phrase, the questions and corresponding documents are organized into categories using available document clustering techniques. Third, when a new document is ingested into the existing corpus, it will be assigned to one or more of the existing categories, and fourth, the questions associated with that category are turned through the system again to find changes to the corpus caused by the addition of the new document.

Fifth, the corpus changes are used to identify documents with potential discrepancies among themselves, and sixth, an entities extraction process is used to generate individual statements for comparison by an ingestion engineer.

Example Usage and Operation.

Multiple documents are ingested into a cognitive computing system to form a corpus as discussed in the previous paragraphs. Additional documents may be added to the corpus at a later time. During the ingestion process, with current technology (i.e., without an embodiment of the present invention), the user is not informed of any discrepancies that might exist among documents which have been ingested into the corpus. During runtime after corpus initialization, when an event is developing, or a long-term story is evolving in which causality and opinions differ, the present inventors have recognized the value of linking corpus documents or document sections based on whether they corroborate or disagree with each other and a hypothesis. Thus, the enhanced output of the cognitive computing system not only would include the candidate answers and their rankings, but also a set of linked documents which support each candidate answer and which controvert each candidate answer.

There are a variety of discrepancies that can be detected, such as material facts might differ (person/place/date), attribution of causality, and subjective factors such as sentiment, etc. The present inventors have realized that this could be valuable as a discovery tool to enrich the presentation of complex topics, such as presenting developing news events along a timeline, or in doing sociological analysis, or attributing the spin given to a story by different stakeholders, or in an enterprise scenario in identifying elements in conflict from various enterprise departments or across time. For example, in today's online news industry, there is a high degree of time pressure to get stories and reports published before the facts relating to them can be sufficiently validated. There might be a fact that comes out initially that is subsequently changed or discovered to be false. But, that change is interesting from analytical perspective such as characterizing the 'initial blame' versus final determination of the actual responsible party for a story or event.

In another example usage case, multiple versions of a product manual may include a lot of similar information, but may also present a small amount of different information. It can be difficult for human readers of such manuals to discern the differences between the two versions. For example, an Apple iPhone4™ user manual may be superseded by an iPhone 5 user manual, but it is not clear due to the vast amount of similarity between the two what is actually changed or different. Using a cognitive computing system, one may ask "what is different between the iPhone 4 and 5 user manuals?", and the output results may show the user only the things that are nearly the same yet have some differing detail: such as a button moved or process is unexpected.

Still other workflows for an administrator managing the ingestion of new documents and document fragments into a cognitive computing system corpus is determining whether or not detected differences are really false or meant as humor, whether a particular source of information perhaps should be blocked from ingestion due to consistently incorrect or offensive information, and whether there are multiple versions of truths that could be promoted to an expert group for review or to an open discussion forum online such as a "wiki" group for further consideration and determination regarding which points are accurate.

First Example Embodiment: A Discrepancy Detection Engine

The document ingestion pre-processor (250) in the present example embodiment would be added to a cognitive computing system as shown and discussed with respect to FIG. 2. Upon addition of a document or user-selection of an analyze option on a user interface, the ingested documents will be analyzed according to the logical processes and machine logic described herein, such as using a machine logic process shown in FIG. 1.

This particular embodiment is realized using a computing core (e.g., CPU 290, system memory 291, various communication and user interfaces 293, and one or more operating systems and optional embedded firmware 292) which performs a logical process (253-259), such as by executing program instructions, operating specialized integrated circuits, or a combination of executing instructions and operating circuits.

An ingested "document", for the purposes of the present disclosure, shall include one or more of each of the following: monolithic documents, large multi-section text documents, individual sections of a text, and micro-documents (e.g., tweets, instant messages, etc.).

The automated logical processes will typically include receiving a new document (big, little or fragment) (i.e., Trec) (251'), and then traversing all the previously-ingested documents (252) while searching for discrepancies amongst them relative to a knowledge domain. The discrepancies to be analyzed (255) may be identified via user-defined templates (254) for key relations, where a template might specify particular facts of interest in the usage-relevant knowledge domain(s) (253), or other criteria such as frequently cited/searched query terms or relationships. An example of such a template might be Person, Place, and Date.

The corpus documents (252) are then traversed for each of the supplied templates. Data from the documents will be supplied using the appropriate templates and saved for analysis. Once the data has been traversed and captured in template format, for example as extracted relationships or other annotations, it can be analyzed for any discrepancies. Sections of any documents that deviate from any other document will be highlighted in the User Interface or marked up in an electronic output to a non-human user (e.g., HTML or XML returned via an API). For each document that is highlighted as potentially different, the relevant documents will be identified and the section of the document will be identified.

If (256) no discrepancies are detected, the system may automatically ingest (257) the Trec (251') into the corpus (252). However, found discrepancies will be flagged (251") such as by highlighting the discrepant portions or passages, and displayed or presented to an administrator for approval (258) to ingest (250) the document with the discrepancies.

Optionally (not shown), the links between the discrepant documents may be recorded into a computer memory structure such as a database for future use in order to provide a user the agreeing and dissenting supporting documents in response to a question which elicits the linked documents.

The general machine logic process for discrepancy detection during ingestion of a new Trec into a cognitive computing system corpus comprises several phases.

Phase 1.

Populate a list of questions that are asked of the system, that are known to have both high confidence and highly rated answers, and for which the answers are in the previously ingested corpus.

(a) Start with a ground truth collection from existing system which maps existing questions to known good answers aligned within the corpus that provides those answers.

(b) Utilize other sources of known-good answers such as user feedback from running system, where the users have had a chance to review and validate the answers produced by the cognitive computing system.

The question-answering pipeline preserves (i) the questions previously asked, (ii) the answers returned in response to the previously-asked questions, (iii) the answer confidences associated with each answer, (iv) which answers were shown or otherwise provided to the user, (v) whether or not the evidence was viewed for each answer, (vi) the user feedback given for each answer, etc.

Phase 2.

The system will align the answered questions with the document(s) or subsection within the document(s) from which the correct answer came. A document in this case could be either an entire doc that was ingested, or individual Trec document sections, or individual tweets, or combinations thereof. The cognitive computing system is capable of mapping the questions to a very fine level within the corpus at this point.

Phase 3.

Organize the questions and document sections into clusters using a conventional clustering method such as K-means. Each cluster will be assigned a unique cluster ID, and clusters within clusters (sub-clusters) may also be created by the system.

Figure 3:
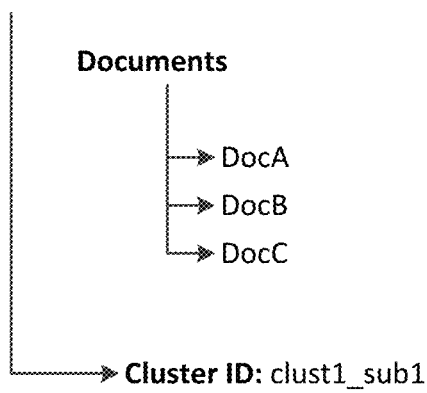
FIG. 3 shows a clustering structure of documents in a general manner.
Figure 3:
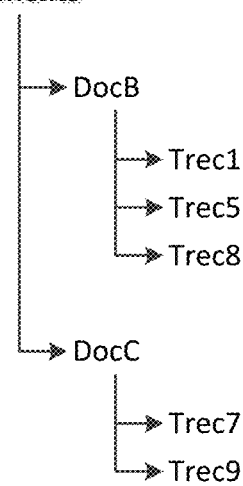

For an example, refer now to FIG. 3 that shows a structure of a cluster of documents identified as "clust1". Within this cluster are three documents, shown as DocA, DocB and DocC. Further, DocB is associated with three document fragments, sections or micro-documents Trec1, Trec5 and Trec8. Similarly, DocC is associated with two fragments, sections or micro-documents Trec7 and Trec9. This structure (300) encapsulates the categorized questions as described in the previous paragraphs.

Figure 4:
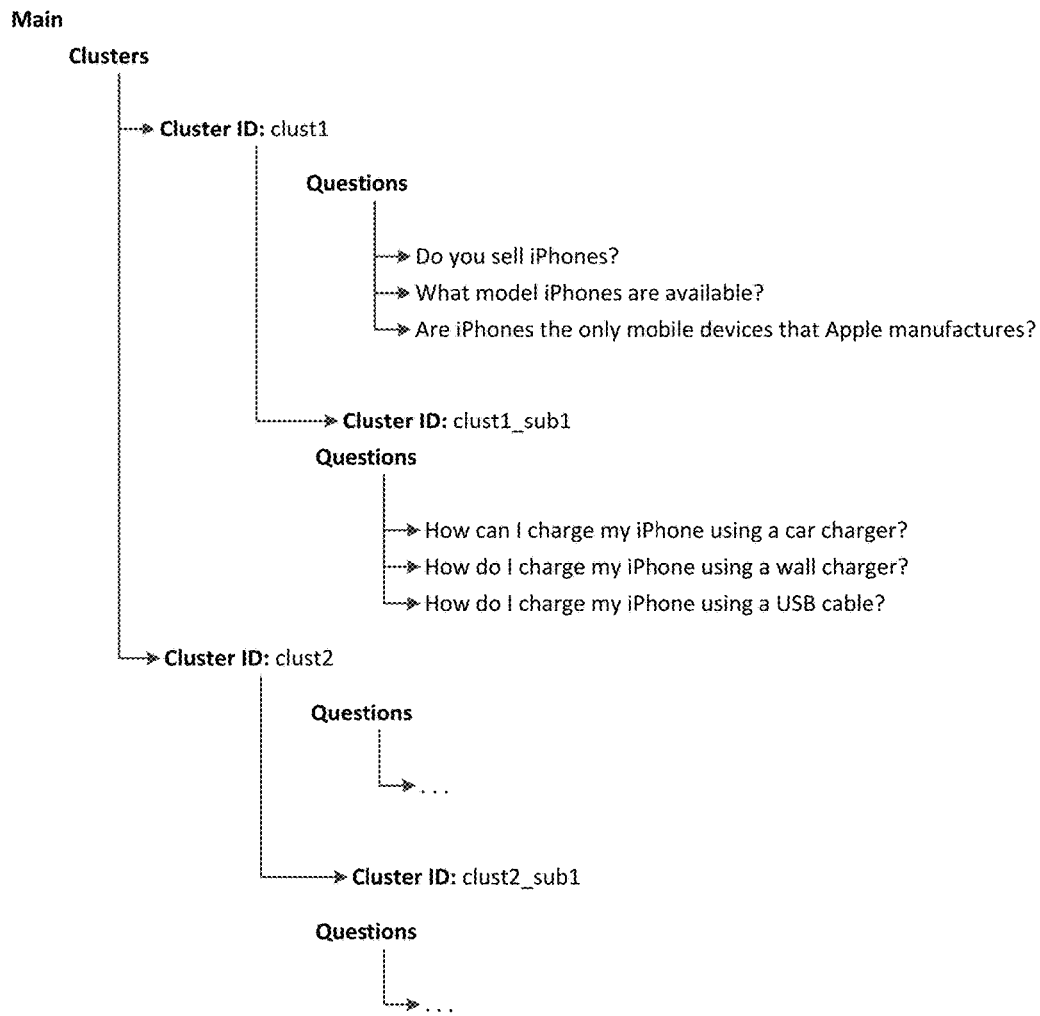
FIG. 4 illustrates one particular example of clustered documents as shown in FIG. 3

A more specific example is shown in FIG. 4 relative to the previously-discussed iPhone user's manual differences. The first cluster Clust1 include three questions: Do you sell iPhones? What model iPhones are available? Are iPhones the only mobile devices that Apple manufactures. Within the first cluster Clust 1 is a sub-cluster clust1_sub1 that includes three questions: How can I charge my iPhone using a car charger? How do I charge my iPhone using a wall charger? How do I charge my iPhone using a USB cable? There may be also a second cluster clust2 of questions and a second sub-cluster, and so forth.

A categorized question may also be a child (member) of more than one cluster. So, for example, the question "How do I charge an iPhone using a wall charger" could be a child or member of a first cluster for "iPhone problems" and also be a child or member of a second cluster for "charging problems", etc. Once the questions have been mapped to clusters, then the system can assign labels to those clusters. In the example above, clust1 could be assigned a label "General iPhone questions", and sub-cluster clust1_sub1 could be assigned the label "iPhone charging methods".

At this point in the initialization of the system, the questions are mapped to clusters and documents mapped to clusters. Thus, the questions are associated to the related to content of the documents in each cluster to which they belong.

Phase 4.

After the corpus has been initialized in the first three phases, as new documents are ingested, the discrepancy detection steps are taken.

(a) Categorize new documents. When a new document is ingested, it too will be categorized. Then, the questions which were previously associated with that topic or category are searched for conflicts with the content of the new document. Once the new document is ingested and turned into Trecs (or other sub-document unit types), and those Trecs are added to relevant clusters and optionally sub-clusters, the system applies questions associated with that cluster of the new Trec files. For example, assume Table 1 represents a simplified state of a corpus before a new document is ingested:

TABLE 1

Simplified State of a Corpus Before New Document Ingestion

| Cluster A | Cluster B | Cluster C |
|---|---|---|
| Doc A, Doc B, Doc C | Doc D, Doc E, Doc F | Doc G, Doc H, Doc I |
| Q1, Q2, Q3 | Q4, Q5 | Q6, Q7 |

After ingestion of the new document, the corpus structure is amended as shown in Table 2:

TABLE 2

Simplified State of a Corpus After New Document Ingestion

| Cluster A | Cluster B | Cluster C |
|---|---|---|
| DocA, DocB, DocC, New Trec1 | DocD, DocE, Doc F | DocG, DocH, DocI, New Trec2 |
| Q1, Q2, Q3 | Q4, Q5 | Q6, Q7 |

The Table 2 shows where the new Trec1 and Trec2 exist in the current state of the system for now. So, for new Trec1, the system queries the questions Q1, Q2 and Q3, while for the NewTrec2, the system queries the questions Q6 and Q7.

If the cognitive search finds that high confidence answer is returned for say Q1 when queried of NewTrec1, then the system declares that NewTrec1 is very closely related to any existing document that previously answered question Q1. The system can then look up which documents in ClusterA have correctly answered question Q1 (it may be more than one document).

So, for example, assume question Q1 has only been answered successfully by document DocA. The system can also ask negatives of the categorized questions, optionally using a method such as that disclosed in U.S. patent application Ser. No. 14/722,862, filed by Byron, et al, which is incorporated by reference into the present disclosure. High confidence answers for negative versions of the question would indicate that the document is possibly in conflict with the previously-ingested documents within that category or cluster. Perhaps in this example situation, the negative query of question Q3 returns a high confidence answer that Q3 is answered by document DocB.

(b) Identify documents for pairwise comparison. Given the foregoing example, the system now has identified two documents to investigate to look for possible conflicts because one document matched the new document using a positive question and another document matched the new document using a negated question from the cluster. The system will now compare the new document NewTrec1 with DocA and DocB to resolve this discrepancy, if it exists.

Turning to an example of how the system compares the new Trec1 with document DocA, assume that DocA, perhaps an electronic medical record, contains the text (501) of FIG. 5, and further assume that the new Trec1, perhaps an obituary listing from an electronic newspaper, contains the text (503). The system can perform entity extraction (502, 504) on the text (of both documents new Trec1 and DocA to yield entities person, dates, locations and causes (i.e. disease). However, the date "today" in the new Trec1 is relative, not absolute.

If no digital date, such as a date contained in metadata for Trec1 is available, the system can presume that "today" corresponds to "March 26th" because of the high degree of matches between the other extracted entities.

If, however, another date, such as a copyright date or a metadata data associated with new Trec1 or another statement found in another document already in the corpus may controvert the date of March 26th, such as the statement (601) with the entities (602) as shown in FIG. 6. In such a case, the system detects and flags this discrepancy.

Similarly, relationship extraction may be performed to establish natural language relationships between extracted entities, and discrepancies may be detected and flagged according to relationship disagreements between newly ingested documents and documents already in the corpus.

For example, consider two relationships parse tree structures Eq. 1 and Eq. 2 which may be generated from the foregoing text examples (501, 503, respectively) using natural language processing which was produced using the openly-available Link Grammar Parser by Davy Temperley, Daniel Sleator and John Lafferty, of Carnegie Mellon University, which is an syntactic parser of English based on "link grammar". Given a sentence, the Link Grammar Parser system assigns to it a syntactic structure, which consists of a set of labeled links connecting pairs of words, producing a constituent (noun phrases, verb phrases, etc.) representation of a sentence:

Eq. 1
(S (NP John Doe)
  (VP died March 26th
    (PP at
      (NP UMass Medical Center))
    (PP from
      (NP Stage 4 Cancer))))
Eq. 2
(S (NP John Doe)
  (VP, leaving
    (NP a wife a child),))
  (VP died March 27th
    (PP at (NP UMass))))

Figure 7:
FIG. 7 depicts discrepancy detection and assignment of confidence factors to each discrepancy according to the nature and type of conflict between the text strings.
Figure 7:

From these extracted relationships using a parser such as this, for example, the embodiment of the present invention can establish that subject entity and the date entities are related by the same action entity values (i.e., died), so the extracted relationships in these examples can be simplified as shown in FIG. 7. In the first pairwise comparison of the dates (701, 702) of the action, a high degree of confidence of a conflict or discrepancy can be assigned by the system (705) and reported.

However, in the second pairwise comparison of the location entities (703, 704), there is some similarity between the text strings (e.g., they both contain the sub-string "UMass"), so the discrepancy may be flagged and given a lower confidence of being a meaningful conflict (706).

Second Example Embodiment: A Discrepancy User Interface

The forgoing phases of a discrepancy detection engine embodiment may be combined with a user interface (UI) embodiment as follows. Those ordinarily skilled in the arts, however, will recognize that the engine and the UI embodiments may be realized and found useful separately, as well, wherein the unifying inventive concept relates to the detection, flagging and confidence rating advantages of the present invention.

Modern word processor application programs allow a user to compare two versions of the same document, and the user interface illustrates to a user the most recent changes. For example, if a phrase is changed in a later version of a document, the user interface of the word processor may show the previous version of the phrase with special marking such as strikethrough text, and may show the next version of the phrase with special marking such as underlining. However, the comparison methods are greatly dependent on the two documents being mostly the same with minor differences. Comparing two documents which are structurally different, such as an obituary and a medical record, would result in one document being entirely shown as deleted (strikeout text) and the other document's text as being inserted (underlining). This is because the word processor application program's comparison routine compares words and strings literally to each other without regard or understanding of the semantic or natural language meaning of the information contained within the compared documents.

Figure 8:
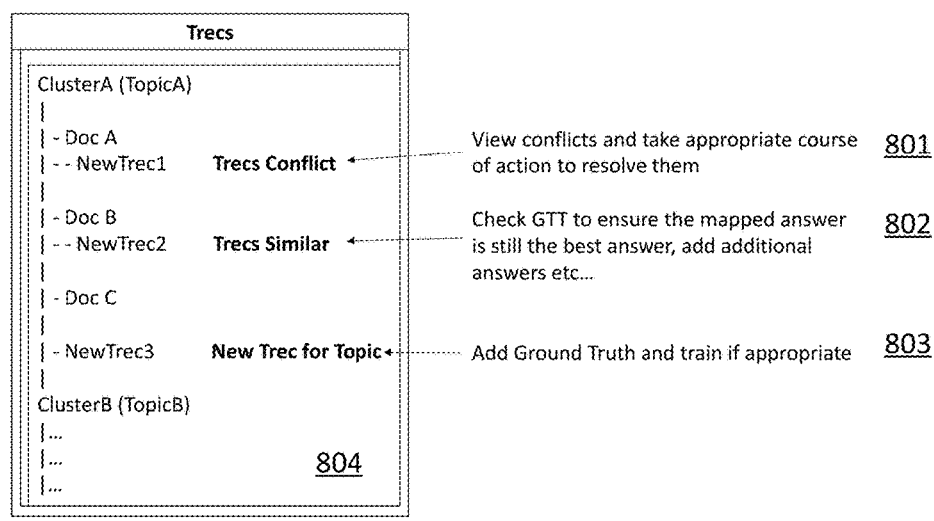
FIG. 8 provides an example user interface for a top-level view of any conflicts within a newly-ingested document relative to the documents already contained in the corpus.

Thus, a user interface according to the present invention is not well-served by the user interface model of word processors. The present inventors, therefore, hereby disclose an inventive user interface such as the example (800) illustrated in FIG. 8 for display on a computer display. A generic computer display does not normally provide such a user interface as described in the following paragraphs, so the available embodiments of the present invention may be realized through programming enhancements which are executed by a computer processor at the application level or the operating system level, or even embedded within a graphics display accelerator device, integrated circuit or chip.

The dialog box (804) is preferably displayed on a portion of a computer display in a manner that conveys the topically-clustered documents, document portions, and micro-documents as described in the foregoing paragraphs. Color may be used to visually set apart conflicts (i.e. red), similarities with differences (i.e. yellow) and agreements (i.e. green) between a newly-ingested document and the documents already in the system's corpus. Still further, the flagging declaration text (801, 802, 803) may be selectable or clickable by a user, such as by manipulation of keys, buttons and/or pointing device(s), to engage a deeper investigation of the discrepancies and similarities which were detected during ingestion processing.

Figure 9:
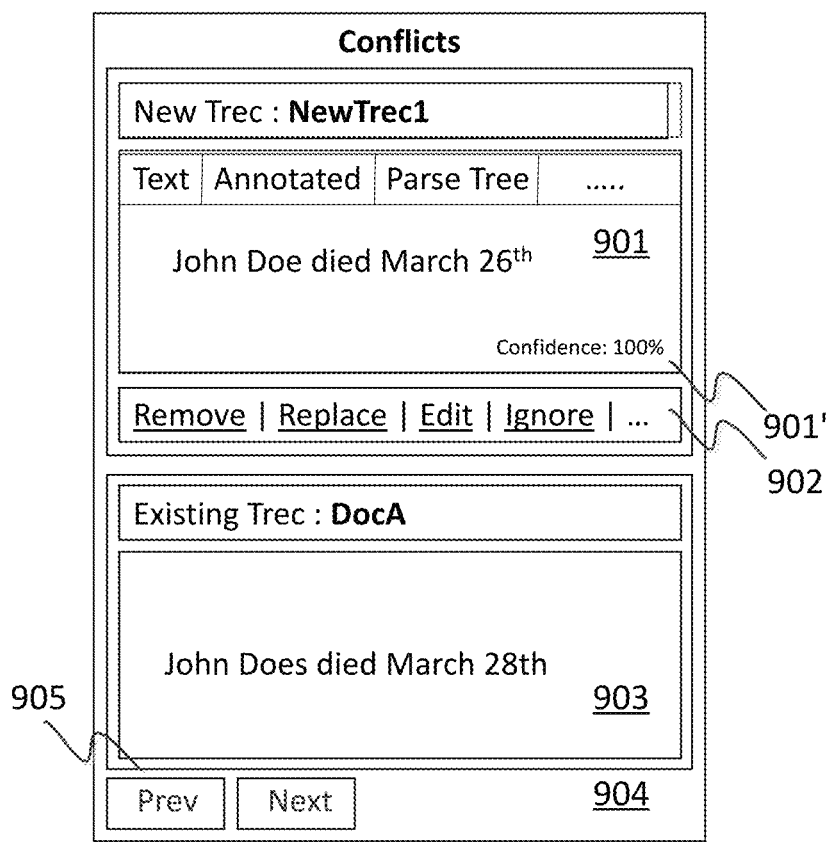
FIG. 9 shows an example user interface for a drill-down view of a user-selected conflict in which a user can see the linked conflicting text and perform one of several reconciliation functions within the corpus.

For example, such as in the engine embodiments disclosed in the foregoing paragraphs in which links between agreeing and controverting documents in the corpus were recorded during ingestion processing, clicking on or selecting the text (801) declaring a conflict between existing DocA in the corpus and the newly-ingested Trec1 may lead to another user information display on the computer display as shown (900) in FIG. 9. A generic computer display does not normally provide such a user interface as described in the following paragraphs, so the available embodiments of the present invention may be realized through programming enhancements which are executed by a computer processor at the application level or the operating system level, or even embedded within a graphics display accelerator device, integrated circuit or chip.

In this drill-down dialog (904), two or more conflicting elements, relationships, or a combination of elements and relationships may be shown (901, 903), along with one or more of the confidence ratings (901'), and one or more commands (902, 905) for user operation to reconcile the differences within the corpus. For example, the foregoing date of death discrepancy may be removed from the newly-ingested Trec1 document, replaced with the date value already found in the corpus, edited manually, ignored, ignored with specially notation, etc.

Using such a top-level summary user interface (800) with one or more drill-down user interfaces (900) for each of the items in the cluster model, an administrator or information engineer may selectively inspect and optionally resolve discrepancies in order to prepare the corpus in advance of querying it by a cognitive computing system.

Optional Tracking of Resolutions.

In some embodiments, such as for applications in which information traceability is required or desired, each change or correction made via the user interfaces to elements and relationships detected as discrepancies can be tracked and recorded into a data structure in a computer memory. In implementation, such change tracking functions may resemble the "undo" list commonly found in word processor application programs and in database monitoring systems.

Computer Program Product Embodiments

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising the steps of:
    receiving, by a computing system, at least a portion of a new document prior to ingestion of the portion into a corpus of a cognitive computing system; and
    still prior to or during ingestion:
        associating, by a computing system, the portion of the new document by topic to at least one category of documents within the corpus;
        automatically querying, by a computing system, using the cognitive computing system, the corpus plus the portion of the new document according to one or more questions previously associated with the category;
        responsive to the querying, automatically detecting, by a computing system, one or more discrepancies between the portion of the new document and the corpus;
        assigning by a computing system a confidence factor to each detected discrepancy; and
        reporting by a computing system the one or more discrepancies and the assigned confidence factors to a user.

2. The method as set forth in claim 1 wherein the category comprises a topical category.

3. The method as set forth in claim 1 wherein the category comprises a cluster of documents within the corpus and wherein the one or more questions are associated with the cluster.

4. The method as set forth in claim 1 wherein the portion of the new document comprises a portion selected from the group consisting of an electronic document, an online news source, a micro-document, and an electronic message.

5. The method as set forth in claim 1 wherein the reporting comprises producing one or more reports selected from the group consisting of a printed output, a dialog on a computer display, and a return via an application programming interface.

6. The method as set forth in claim 5 further comprising the steps of:
    recording by a computing system a digital link between the portion of the new document and the one or more documents of the corpus with which a discrepancy is found; and
    providing by a computing system the links as user-operable selections within the report, thereby enabling a user to drill-down from the report to review actual disagreeing source text.

7. A computer program product comprising:
    a tangible, computer-readable computer memory device which is not a propagating signal per se; and
    program instructions encoded by the computer memory device for causing a processor to, when executed, perform steps comprising:

receiving at least a portion of a new document prior to ingestion of the portion into a corpus of a cognitive computing system; and still prior to or during ingestion:

associating the portion of the new document by topic to at least one category of documents within the corpus;

automatically querying using the cognitive computing system the corpus plus the portion of the new document according to one or more questions previously associated with the category;

responsive to the querying, automatically detecting one or more discrepancies between the portion of the new document and the corpus;

assigning a confidence factor to each detected discrepancy; and reporting the one or more discrepancies and the assigned confidence factors to a user.

8. The computer program product as set forth in claim 7 wherein the category comprises a topical category.

9. The computer program product as set forth in claim 7 wherein the category comprises a cluster of documents within the corpus and wherein the one or more questions are associated with the cluster.

10. The computer program product as set forth in claim 7 wherein the portion of the new document comprises a portion selected from the group consisting of an electronic document, an online news source, a micro-document, and an electronic message.

11. The computer program product as set forth in claim 7 wherein the reporting comprises producing one or more reports selected from the group consisting of a printed output, a dialog on a computer display, and a return via an application programming interface.

12. The computer program product as set forth in claim 11 wherein the program instructions further comprising program instructions for causing the processor to perform steps comprising:

recording a digital link between the portion of the new document and the one or more documents of the corpus with which a discrepancy is found; and providing the links as user-operable selections within the report, thereby enabling a user to drill-down from the report to review actual disagreeing source text.

13. A system comprising:

a computing system having a processor;

a tangible, computer-readable computer memory device which is not a propagating signal per se; and program instructions encoded by the computer memory device for causing the processor to, when executed, perform steps comprising:

receiving at least a portion of a new document prior to ingestion of the portion into a corpus of a cognitive computing system; and still prior to or during ingestion:

associating the portion of the new document by topic to at least one category of documents within the corpus;

automatically querying using the cognitive computing system the corpus plus the portion of the new document according to one or more questions previously associated with the category;

responsive to the querying, automatically detecting one or more discrepancies between the portion of the new document and the corpus;

assigning a confidence factor to each detected discrepancy; and reporting the one or more discrepancies and the assigned confidence factors to a user.

14. The system as set forth in claim 13 wherein the category comprises a topical category.

15. The system as set forth in claim 13 wherein the category comprises a cluster of documents within the corpus and wherein the one or more questions are associated with the cluster.

16. The system as set forth in claim 13 wherein the portion of the new document comprises a portion selected from the group consisting of an electronic document, an online news source, a micro-document, and an electronic message.

17. The system as set forth in claim 13 wherein the reporting comprises producing one or more reports selected from the group consisting of a printed output, a dialog on a computer display, and a return via an application programming interface.

18. The system as set forth in claim 17 wherein the program instructions further comprising program instructions for causing the processor to perform steps comprising:

recording a digital link between the portion of the new document and the one or more documents of the corpus with which a discrepancy is found; and providing the links as user-operable selections within the report, thereby enabling a user to drill-down from the report to review actual disagreeing source text.

* * * * *